United States Patent
Rahn et al.

(10) Patent No.: US 12,267,217 B2
(45) Date of Patent: Apr. 1, 2025

(54) HIGH FREQUENCY ROTATION OF CRYPTOGRAPHIC DATA

(71) Applicant: Arista Networks, Inc., Santa Clara, CA (US)

(72) Inventors: Ethan Rahn, Agoura Hills, CA (US); Douglas Gourlay, Tahoe City, CA (US); Kenneth Duda, Santa Clara, CA (US); Ian O'Brien, Cobh (IR); Pranav Choudhary, Karnataka (IN); Rajat Bajaj, Punjab (IN); Hua Zhong, San Jose, CA (US)

(73) Assignee: ARISTA NETWORKS, INC, Santa Clara, CA (US)

( * ) Notice: Subject to any disclaimer, the term of this patent is extended or adjusted under 35 U.S.C. 154(b) by 459 days.

(21) Appl. No.: 17/643,272

(22) Filed: Dec. 8, 2021

(65) Prior Publication Data
US 2023/0078179 A1    Mar. 16, 2023

(30) Foreign Application Priority Data

Sep. 10, 2021 (IN) .............................. 202141041101

(51) Int. Cl.
| | | |
|---|---|---|
| G06F 9/00 | (2018.01) | |
| H04L 41/046 | (2022.01) | |
| H04L 41/082 | (2022.01) | |
| H04L 41/0893 | (2022.01) | |
| H04L 41/28 | (2022.01) | |

(52) U.S. Cl.
CPC ............ *H04L 41/28* (2013.01); *H04L 41/046* (2013.01); *H04L 41/082* (2013.01); *H04L 41/0893* (2013.01)

(58) Field of Classification Search
CPC ... H04L 9/0891; H04L 41/0886; H04L 63/10; H04L 9/0894; H04L 41/046; H04L 41/082; H04L 41/0893; H04L 41/28; H04L 41/0813; H04L 41/12; G06F 21/602
See application file for complete search history.

(56) References Cited

U.S. PATENT DOCUMENTS

| | | | | |
|---|---|---|---|---|
| 9,652,769 | B1* | 5/2017 | Golin | G06Q 20/38215 |
| 11,144,513 | B1* | 10/2021 | Padisetty | G06F 16/122 |
| 2003/0219129 | A1* | 11/2003 | Whelan | H04L 63/0428 380/270 |
| 2006/0233375 | A1* | 10/2006 | Lillie | H04L 9/0891 380/270 |
| 2012/0140923 | A1* | 6/2012 | Lee | H04L 9/0894 380/44 |
| 2013/0129095 | A1* | 5/2013 | Fahrny | H04L 63/068 380/279 |
| 2014/0115171 | A1* | 4/2014 | Shin | H04L 67/01 709/227 |

(Continued)

*Primary Examiner* — Suraj M Joshi
*Assistant Examiner* — Hao H Nguyen
(74) *Attorney, Agent, or Firm* — Fountainhead Law Group, PC

(57) ABSTRACT

A centralized manager in a network deployment is configured to perform periodic automated rotation of secrets used in the network and customer devices in the deployment. The centralized manager is further configured with intelligence to automatically install the rotated secrets onto the deployed devices. The centralized controller can provide high frequency rotations to improve network security.

18 Claims, 6 Drawing Sheets

(56) References Cited

U.S. PATENT DOCUMENTS

| | | | |
|---|---|---|---|
| 2014/0380421 A1* | 12/2014 | Schultz | H04L 67/141 |
| | | | 726/4 |
| 2015/0006882 A1* | 1/2015 | Hernandez | H04L 63/06 |
| | | | 713/155 |
| 2016/0105283 A1* | 4/2016 | Mityagin | H04L 9/12 |
| | | | 380/279 |
| 2017/0208095 A1* | 7/2017 | Wei | H04L 63/20 |
| 2018/0219915 A1* | 8/2018 | Chopra | H04L 63/0485 |
| 2019/0188373 A1* | 6/2019 | Gupta | G06F 21/45 |
| 2019/0190710 A1* | 6/2019 | Chopra | G06F 9/45558 |
| 2020/0274705 A1* | 8/2020 | Robison | H04L 63/0428 |
| 2020/0279258 A1* | 9/2020 | Agrawal | G06Q 20/3829 |
| 2021/0176222 A1* | 6/2021 | Scott | H04L 9/0866 |
| 2022/0156387 A1* | 5/2022 | Keller | G06F 21/554 |
| 2022/0200801 A1* | 6/2022 | Potlapally | H04L 63/0435 |
| 2022/0337041 A1* | 10/2022 | Wilson | H02G 3/263 |
| 2022/0417036 A1* | 12/2022 | Donlan | H04L 63/0823 |
| 2023/0309153 A1* | 9/2023 | Maria | H04W 12/02 |
| 2023/0337002 A1* | 10/2023 | Hu | H04W 12/37 |

* cited by examiner

HIGH FREQUENCY ROTATION OF CRYPTOGRAPHIC DATA

CROSS REFERENCE TO RELATED APPLICATIONS

Pursuant to 35 U.S.C. § 119(a), this application is entitled to and claims the benefit of the filing date of India Provisional Application Number 202141041101 filed Sep. 10, 2021, the content of which is incorporated herein by reference in its entirety for all purposes.

BACKGROUND

A network deployment can employ different protocols that use different types of cryptographic techniques to authenticate their peers (e.g., passwords, etc.) and to encrypt and decrypt traffic through network devices (e.g., switches, routers, L3 switches and the like). Cryptographic techniques include the use of hashed values (e.g., to encode passwords), symmetric keys (e.g., to encrypt and decrypt messages, authenticate peers, etc.), asymmetric keys (e.g., public key cryptography), and the like.

Routinely changing the cryptographic data (also referred to as "rotating secrets") is an important part of a secure network deployment. The effort is typically a manual process. Changing encryption keys, passwords, and other secrets requires the user to generate and manage numerous random character sequences, access each device on a box-by-box basis to configure the new keys and passwords, and is typically performed during defined maintenance windows. The task can be labor intensive, especially in a large deployment.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

Figure 1:
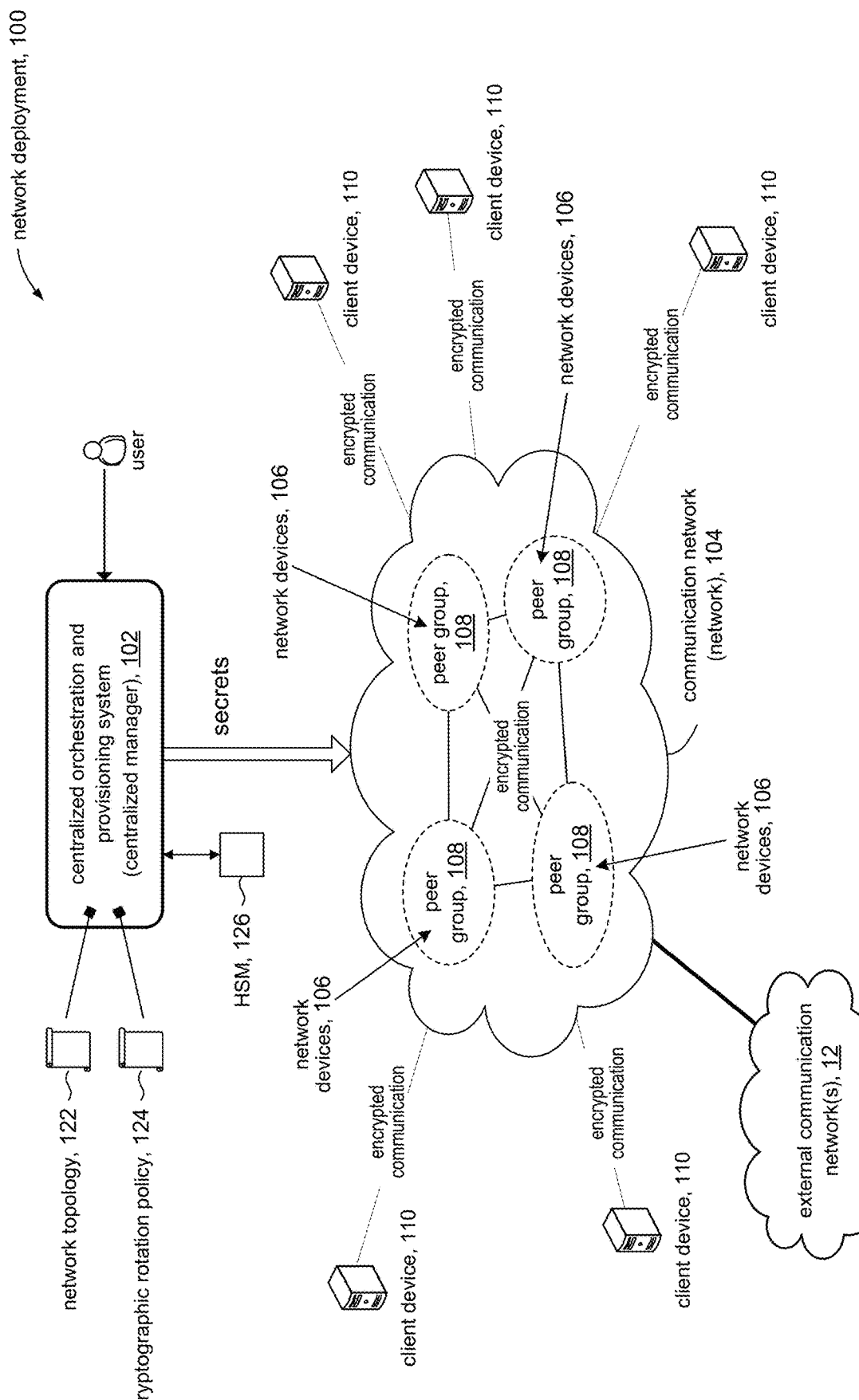
FIG. 1 is a high level diagram of a network deployment in accordance with the present disclosure.

Manually rotating cryptographic keys for devices in a deployed system from a command line interface (CLI) is labor intensive and prone to human error, risking network outages or incorrect enforcement of security policies. Manual rotation, and even using scripts, is a cumbersome process especially when the user has to rotate secrets for a large number of devices. The effort is exacerbated given that most devices in the deployment employ several security measures requiring multiple secrets. The effort is further made more difficult if a high degree of security is desired which would require frequent rotation.

The present disclosure discloses a centralized network manager (centralized manager) configured to rotate the cryptographic data at a high frequency, during normal network operation, and without human intervention to minimize the chances for misconfigurations that can bring down connections. A centralized manager in accordance with the present disclosure can rotate secrets in the network at a high frequency to provide an extra layer of security by making protocols use new keys after a period of time. The centralized manager can periodically generate a new strong value of secret and push it to the required set of devices. In some embodiments, the centralized manager can coordinate with an off-board or on-board hardware security module (HSM) for high-entropy key generation in regulated environments.

Operations of a centralized manager in accordance with some embodiments can include:

Receiving one or more rotation schedules from a user. A rotation schedule can specify a group of devices in the network or a protocol. The user can customize rotation schedules on a per-protocol/per-site/per-region/per-arbitrary tag basis. Default schedules can be based on regulatory guidance/best practices. The user can specify a start time and a rotation frequency for a rotation schedule; e.g., rotate every x units of time, where units of time can be seconds, minutes, days, and so on. Alternatively, a rotation schedule can specify times during the day, days of the week, and so on for secret rotation.

When a scheduled rotation is due, the centralized manager can generate cryptographic data suitable for the target specified in the rotation schedule; e.g., devices, protocols, etc. In some embodiments, the centralized manager can generate cryptographic data using suitable random number or random bit generation algorithms. These can be pseudo or truly random based on the source of entropy (e.g., an external HSM).

The centralized manager can communicate with the devices specified in the rotation schedule to configure the devices with the newly generated cryptographic data; e.g., by storing the newly generated cryptographic data in the devices.

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

FIG. 1 shows an example of a networked communication system (network deployment 100) that can be configured in accordance with the present disclosure. Deployment 100 can be provisioned for an organization or enterprise, such as a business, educational institution, governmental entity, healthcare facility, and so on. Deployment 100 can include a centralized orchestration and provisioning system (centralized manager) 102 to provision, configure, and manage the deployment. Deployment 100 can include client (customer) devices 110 connected via a communication network (network) 104. Network 104 can comprise an interconnection of networked devices 106. Network 104 can connect to one or more external communication networks 12 to provide network access outside of the organization or enterprise.

Centralized manager 102 can be configured to provide centralized automation of network operations, including network device provisioning, compliance, change management, network monitoring, and the like. In accordance with the present disclosure, centralized manager 102 can be further configured to provide and manage centralized rotation of cryptographic information installed in network devices 106 that make up network 104.

Network 104 provides communications among client devices 110. Client devices 110 can be customer edge devices, host machines such as servers, user computers (desktops, laptops, etc.), and so on. Network devices 106 in network 104 can be arranged into peer groups 108. Network devices 106 include routing and switching devices such as top-of-rack ("ToR") switches, aggregation switches, gateways, ingress and/or egress switches, provider edge devices, and the like.

Deployment 100 can provide secured communication for users within the organization or enterprise by encrypting the communications among devices in the deployment. In some embodiments, for example, network devices 106 can be configured to encrypt and decrypt data packets. The network devices can be organized into peer groups 108. Network devices 106 belonging to a peer group are configured to communicate using the same configuration of a given security protocol. As used herein, in some contexts the phrase "security protocol" will be understood to refer to protocols such as Media Access Control Security (MACsec), Internet Protocol Security (IPsec), and the like, which encrypt data communications. In some contexts, security protocol will be understood to refer to non-encryption protocols, for example, challenge/response protocols that use password authentication, security tokens, etc.

Data encryption techniques and encryption strategies are very well understood. Basically, data encryption involves the use of encryption keys and corresponding decryption keys. A device (e.g., client device, network device) encrypts data packets using an encryption key prior to transmission. A device receiving the encrypted packet decrypts the received packet with a corresponding decrypting key. In order to strengthen the security in deployment 100, the cryptographic information used by the client and network devices can be updated (rotated) on a frequent periodic, or otherwise repeated, basis.

In accordance with the present disclosure, centralized manager 102 can be configured to manage cryptographic information (also referred to as digital authentication credentials, secrets, etc.), such as encryption and decryption keys, passwords, tokens, and so on. Centralized manager 102 can automatically and autonomously rotate cryptographic information and update the devices in deployment 100, including network devices 106 in network 104 and client devices 110 connected to the network. In some embodiments, centralized manager 102 can be configured with hardware security module (HSM) 126 to facilitate generating strong, high entropy random information. The HSM can be an internal component of the centralized manager, or the HSM can be external to the centralized manager. The process is automated and autonomous in the sense that generating new cryptographic information and configuring the devices with the new cryptographic information are performed absent any user interaction. In other words, the user does not participate in generating new cryptographic information and the user does not push the newly generated cryptographic information to devices in deployment 100. Moreover, the user does not trigger the process of generating new cryptographic information and configuring the devices with the new cryptographic information.

Centralized manager 102 includes network topology 122 and cryptographic rotation policy 124. Network topology 122 represents information that identifies network devices in the network 104 and their connectivity with each other. The topology can also identify client devices 110 that are connected to the network. It will be appreciated that the information representing network topology 122 can be stored in any suitable form on any suitable data storage medium. The network topology can provide centralized manager 102 with a network-wide view of deployment 100 to inform the process of rotating cryptographic information in accordance with the present disclosure.

Cryptographic rotation policy 124 comprises cryptographic information (keys, passwords, hash keys, etc.) that are stored or otherwise installed in the client and network devices and parameters for rotating the cryptographic information. Cryptographic rotation policy 124 can include parameters such as how frequently the cryptographic information is rotated (rotation frequency), which devices/peer groups are rotated, when to do the rotations (e.g., time of day, week, etc.), and so on. While the actual process of rotating cryptographic information is automated/autonomous (i.e., performed without user intervention) as mentioned above, the information that constitutes or defines the cryptographic rotation policy itself can be provided by a user such as a network administrator.

Figure 2:
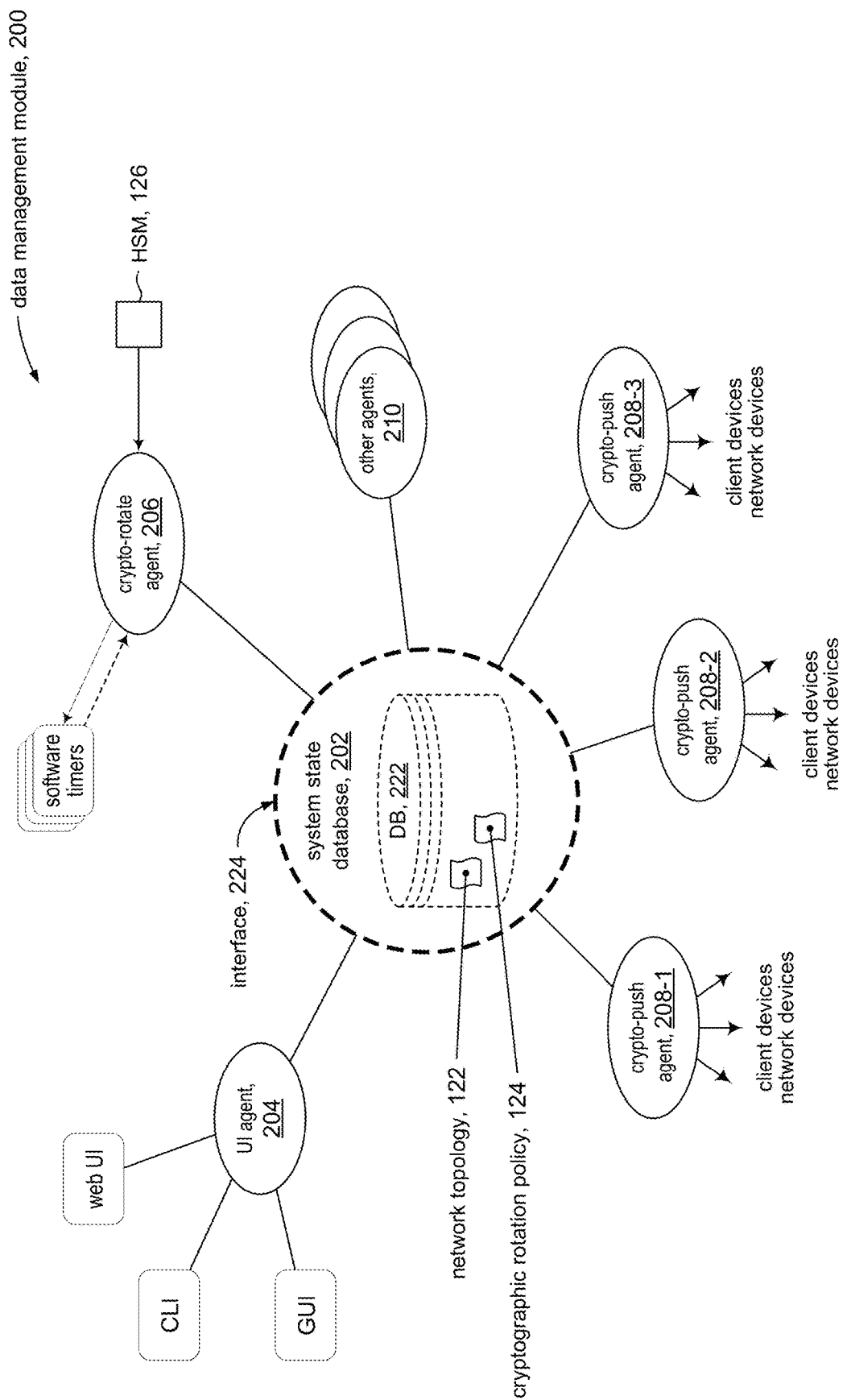
FIG. 2 is a high level diagram of a data management module in accordance with some embodiments of the present disclosure.

Turning now to FIG. 2, centralized manager 102 can include a data management module 200 in accordance with some embodiments of the present disclosure. Merely for discussion purposes and to support a description of the present disclosure, data management module 200 can be loosely fashioned after CloudVision®, a state-driven network management system, available from Arista Networks, Inc. of Santa Clara, Calif. It will be appreciated of course that a data management module in accordance with the present disclosure can be based on any suitable data structures and software architecture.

In some embodiments, data management module 200 can include system state database 202 and agents 204-210. Agents 204-210 can be processes, process threads, etc. that execute on centralized manager 102. Agents interact with elements of deployment 100 (e.g., users, network devices, client devices, etc.) to collect state information and to write or otherwise store that state information in system database 202. Agents that use certain state information can subscribe to system database 202 to receive updates to that state information.

System database 202 can include a database (DB) component 222 and an interface component 224. DB component 222 serves to store state information of deployment 100. In some embodiments, for example, the DB component can be an in-memory structure that is stored in a random access memory (RAM) on centralized manager 102. In other embodiments, DB component 222 can be a data store such as a disk storage system.

Interface component 224 can include application programming interfaces (APIs) and utilities to provide agents 204-210 with read/write access to DB component 222. Interface component 224 can receive state information from agents 204-210 and write/store the received state information to the DB component. Interface component 224 can also push/publish notifications to agents 204-210. When an agent makes updates/changes to some system state, system database 202 can notify agents who have subscribed to that state information.

Agents in accordance with some embodiments of the present disclosure include UI agent 204 to communicate with a suitable user interface (UI), such as a command line interface (CLI), graphical UI (GUI), web-based UI, and so on. In accordance with some embodiments, UI agent 204 can be configured to receive parameters to configure the cryptographic information used by network devices and client devices in deployment 100 and for rotating the cryptographic information. UI agent 204 can write these parameters to cryptographic rotation policy 124. Crypto-rotate agent (rotation agent) 206 can configure a rotation schedule to generate new/updated cryptographic information according to rotation parameters in cryptographic rotation policy 124. One or more crypto-push agents (push agents) 208 can push the updated cryptographic information to the client and network devices in response to being notified that the cryptographic information has been updated. Additional details of agents 204-208 are discussed below. It will be appreciated that data management module 200 can include other agents 210 to support other operations in deployment 100. For example, each device can be associated with one or more (device) agents to collect state information on the device such as port configurations, port states (up, down, etc.), counters, and so on, and write that state information to DB component 222. Agents can be instantiated to support link aggregation groups, and so on.

Figure 3A:
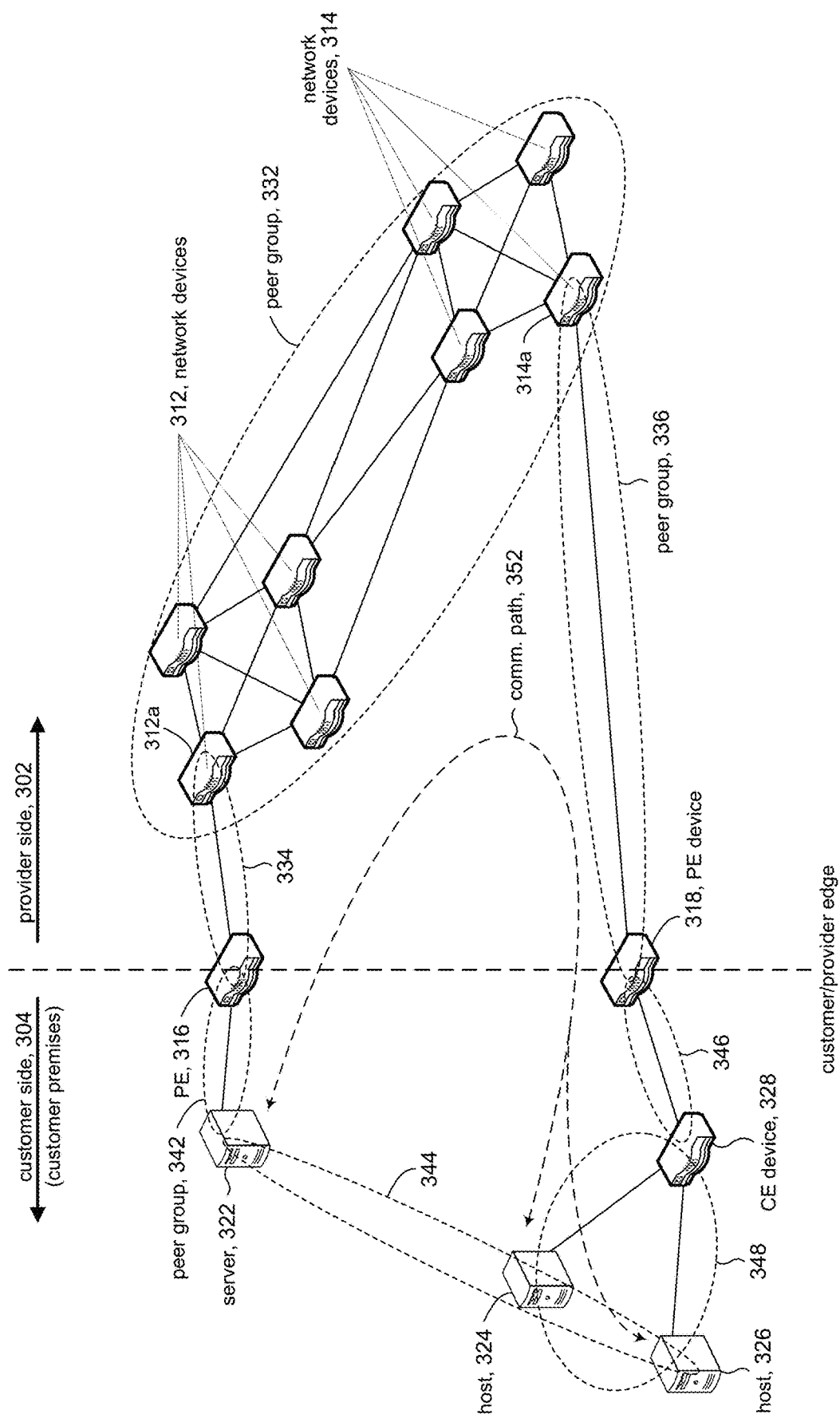
FIGS. 3A and 3B show examples of peer groups in the context of the present disclosure

Referring to FIG. 3A, the discussion now turns to a brief description of some illustrative examples of peer groups as used in the context of the present disclosure. FIG. 3A shows a deployment of devices in a system comprising network devices 312, 314 deployed on provider side 302 and client devices 322, 324, 326 deployed on customer side 304. The deployment further includes provider edge (PE) devices 316, 318 at the customer/provider edge. Customer side 302 can include customer edge device 328 to connect a customer-side network to the provider network.

As noted above, peer groups can be based on how devices secure their communications. In other words, devices (e.g., network devices 106, client devices 110) that use the same cryptographic technique (security protocol) can be members of a peer group. Although security protocols are well known and understood, a brief description of some protocols is given to provide some context and examples for the present disclosure:

Media Access Control Security (MACsec) is a security protocol defined by IEEE standard 802.1AE. MACsec provides point-to-point security between devices on their respective Ethernet links. When MACsec is enabled on an Ethernet link, the link is secured when matching security keys (encryption/decryption keys) are exchanged and verified between the interfaces at each end of the link.

The Intermediate State-Intermediate State (IS-IS) protocol is used to exchange topology information among routers. The topology is used to compute end-to-end paths between routers. IS-IS allows for the configuration of a password for a specified link, an area, or a domain. Routers that want to become neighbors exchange the same password. A router not in possession of the appropriate password is prohibited from participating in the communication.

Internet Protocol Security (IPsec) is a secure network protocol suite that authenticates and encrypts the packets of data to provide secure encrypted communication over an Internet Protocol network. IPsec includes protocols for establishing mutual authentication between devices at the beginning of a session and negotiation of cryptographic keys to use during the session.

Exchanges using the Border Gateway Protocol (BGP) can be authenticated so that only trusted routing devices participate in autonomous system (AS) routing updates. When configured for authentication, BGP creates an encoded checksum that is included in the transmitted packet. The receiving routing device uses an authentication key (password) to verify the packet's checksum.

As noted above, security protocols as used herein can refer to challenge-response exchanges between servers (e.g., 322) and hosts (e.g., 326, 324), for example, by using passwords. For example, hosts wanting access to a server may be required to log onto the server using a password or other security mechanism; e.g., multiple hosts talking to a network time protocol (NTP) server. Likewise, hosts may be configured with a secure shell key (sshkey) to allow servers to access them.

Continuing with FIG. 3A, suppose network devices 312, 314 secure their communication using MACsec. Network devices 312, 314 can be said to constitute peer group 332. Likewise, CE device 328 and hosts 324, 326 constitute a peer group 348 if they communicate using a security mechanism.

A device can be a member in multiple peer groups when the device uses a different security protocol or the same security protocol with different parameters (e.g., different keys). For example, suppose network devices 312 and 314 communicate using MACsec with security keys K1. Network devices 312, 314 constitute peer group 332. Suppose network device 312a communicates with PE device 316 also using MACsec, but with different security keys K2 different from security keys K1. The devices 312a, 316 can be viewed as being members of a peer group 334 different from peer group 332. Likewise, peer group 336 represents a configuration where device 314a and device 318 communicate using a different security configuration than the configuration used by peer group 332.

Peer groups (e.g., 342, 344, 346, 348) can be defined on customer side 304. A peer group on customer side 304 can be defined across provider network 302. For example, suppose hosts 324, 326 communicate with server 322 via provider network 302 over communication path 352 using secure shell, then the machines can constitute a peer group 344.

Figure 3B:
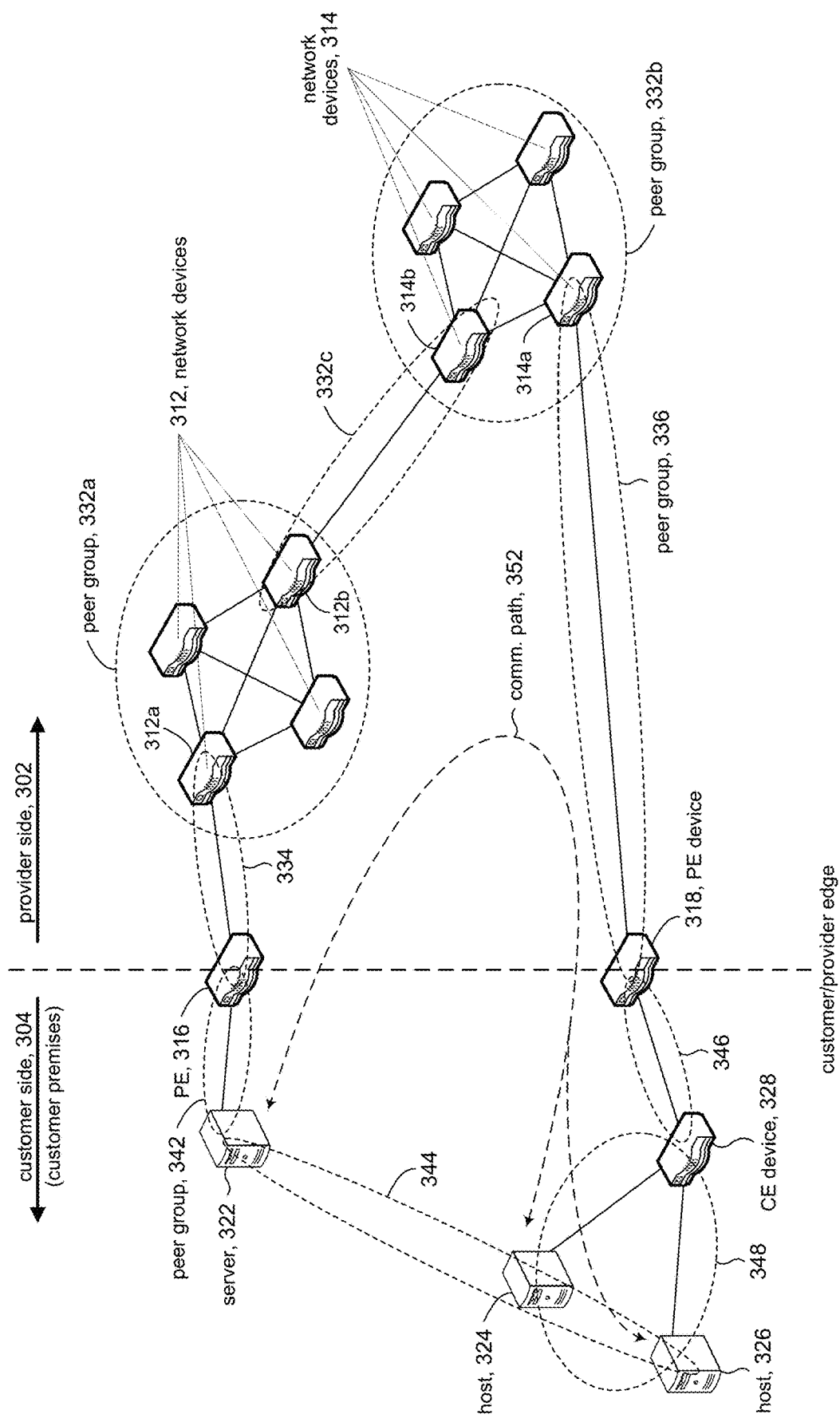

Referring to FIG. 3B, peer groups can be defined at different levels of granularity. FIG. 3B, for example, shows that network devices 312, 314 can be partitioned into separate peer groups 332a, 332b. For example, network devices 312 and network devices 314 may both use MACsec, but have different respective encryption/decryption keys. Accordingly, network devices 312 constitutes peer group 332a and network devices 314 constitute peer group 332b. Network devices 312b, 314b can be linked to provide communication between peer groups 332a, 332b. Network devices 312b, 314b can constitute yet another peer group 332c.

Figure 4:
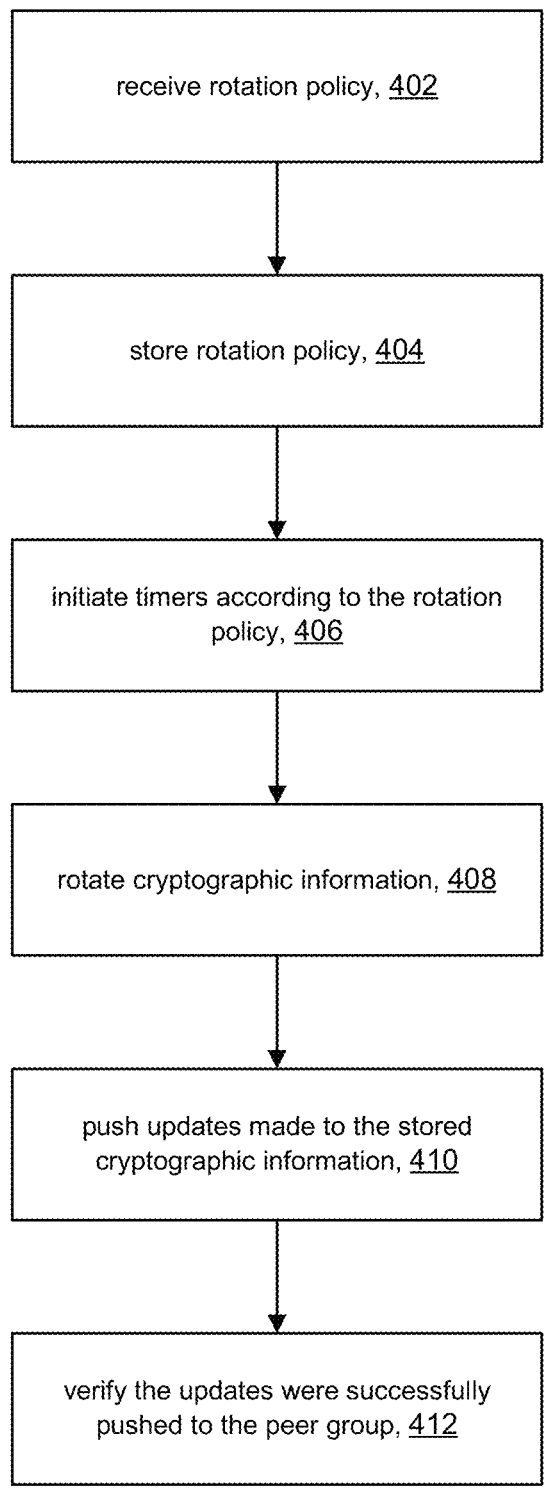
FIG. 4 shows operations in accordance with the present disclosure.

Referring to FIG. 4 and other figures, the discussion will now turn to a high level description of operations and processing in a centralized network management system (e.g., centralized manager 102) to rotate cryptographic information among devices (e.g., network devices 106, client devices 110) deployed in a networked system in accordance with the present disclosure. In some embodiments, for example, the centralized manager can include computer executable program code, which when executed by one or more processors (e.g., 502, FIG. 5) in the centralized manager can cause the processors to perform operations in accordance with FIG. 4. The operation/processing blocks described below are not necessarily executed in the order shown, and can be allocated for execution among one or more concurrently executing processes and/or threads.

At operation 402, the centralized manager can receive parameters and other information from a user (e.g., network administrator). In some embodiments, for example, the centralized manager can include a UI agent (e.g., 204) that executes on the centralized manager. The UI agent can receive information for the rotation policy including, but not limited to:

peer groups—This information identifies groups of network and client devices in deployment 100 that use the same cryptographic information to securely communicate with each other. The user can create new peer groups and/or make updates to existing peer groups. For example, the UI agent can access the network topology to produce a network-wide view of deployment 100 for the user to facilitate identifying and configuring peer groups. The network-wide view allows users to create rules without having to pick each device on which to rotate the secrets. For example, users can create rules like—rotate secrets on all IS-IS routers in datacenter US-East. However, it will be appreciated that any information, in addition to or instead of the network topology, that identifies devices in the network can be used to define peer groups. Information includes, but is not limited to MAC addresses, IP addresses, device serial numbers, Hostnames, and so on.

security protocols—This information specifies parameters for the security protocols used by the peer groups. Depending on the security protocol, this can include encryption/decryption keys, passwords, certificates, and so on.

rotation schedule—This information includes schedules for rotating cryptographic information. The user can specify rotations at varying levels of granularity. At one end of the spectrum, the user can specify a rotation schedule to rotate secrets on a periodic basis for the entire network. The rotation schedule can be configured to rotate secrets at different rates for different protocols. For example, cryptographic keys for MACsec may be rotated more frequently than for BGP. Secret rotation can be scheduled based on subgroups of devices within the network managed by the centralized manager. For example, cryptographic keys used by devices within an organization may be rotated more frequently than for devices that face external partners, who may require coordination when rotating secrets. The rotation schedule can specify a frequency; e.g., every few seconds or minutes, every hour, multiples times during the day, every day, every n days, and so on. The user can specify a time or times of the day to perform the rotation. It can be appreciated that the rotation schedule contemplates any suitable schedule at any suitable granularity.

keying source—The keying source is what generates the key used. In other words a type of Random Number Generator (RNG). RNGs include, but are not limited to, pseudo-RNGs in cryptographic libraries, the credential managers kernel's PRNG, external hardware RNGs such as an HSM, etc.

other information—Users may provide security parameters to use for the key. For example, rotating an x.509 certificate requires a 2048-bit RSA key.

At operation 404, the centralized manager can store the rotation policy. In some embodiments, for example, the UI agent can write the rotation policy into a database (e.g., system state database 202) maintained in the centralized manager.

At operation 406, the centralized manager can initiate one or more timers according to scheduling information in the rotation policy to schedule rotations of the cryptographic information. In some embodiments, for example, the centralized manager can include a rotation agent (e.g., crypto-rotate agent 206). The rotation agent can be triggered when the rotation policy has been updated. In some embodiments, for example, the system state database can signal the rotation agent to indicate that update(s) to the rotation policy have been written to the database. In response, the rotation agent can set up timers (e.g., software timers) to schedule the rotations. As discussed above, the rotation policy can specify different schedules; for example, rotations can be made on a per peer group basis, security protocols, and so on. Each schedule can have its own timer or set of timers.

At operation 408, the centralized manager can rotate cryptographic information in response to expiration of a timer corresponding to the cryptographic information. In some embodiments, for example, when a timer expires, the timer can signal the rotation agent. The timer can be associated with one or more peer groups, which in turn identifies the corresponding security protocol(s) that need to be updated. The rotation agent can generate new cryptographic information that is appropriate for the corresponding security protocols. For example, in the case of MACsec, the rotation agent can generate a new pair of encryption/decryption keys. In the case of a secure shell for a server or a client device, the rotation agent can generate a new password, and so on. In some embodiments, the rotation agent can generate cryptographic data using suitable random number or random bit generation algorithms. These can be pseudo-random or truly random based on the source of entropy. In some embodiments, the rotation agent can interact with one or more hardware security modules (e.g., HSM 126) for high-entropy key generation. Because the cryptographic information is computer-generated, the secrets (e.g., encryption/decryption keys, password, etc.) can be much stronger than human-generated secrets. The rotation agent can write the newly generated (updated) cryptographic information to the system state database. The rotations run automatically (rotations are triggered by timers) and autonomously without user intervention (the rotation agent generates its own secrets, and in some embodiments with the help of HSMs).

At operation 410, the centralized manager can push updated cryptographic information to one or more peer groups associated with the updated cryptographic information. The cryptographic information can then be stored or otherwise installed in the devices of each peer group. In some embodiments, the centralized manager can include one or more push agents (e.g., crypto-push agent 208) that execute on the centralized manager. Each push agent may correspond to a peer group, and be configured to rotate cryptographic information used by the corresponding peer group, for example, by replacing cryptographic information already stored in the devices with the updated cryptographic information. In some embodiments, some devices may require cryptographic authentication by the centralized manager (via push agents) prior to accessing the devices.

A push agent can be triggered when newly generated cryptographic information (e.g., operation 406) is available for devices in the peer group that is associated with the push agent. In some embodiments, for example, the system state database can signal a push agent when newly generated cryptographic information for the corresponding peer group has been written to the database. In response, the push agent can initiate a communication sequence with one or more member devices of the peer group to install or otherwise configure the peer group with the newly generated cryptographic information; for example, by storing new encryption and decryption keys in a network device, storing a new password in a client device, etc. Push agents in accordance with the present disclosure can be configured with the intelligence to understand the requirements of different security protocols and ensure seamless rotation of secrets. Automating the process using properly configured push agents allows for frequent rotations.

The specific interactions between a push agent and its associated peer group to configure the peer group with new cryptographic information depends on the security protocol used by that peer group. Different security protocols have different requirements for rotating secrets. The push agent's participation in rotating a new secret varies depending on the protocol.

Protocols like MACsec and BGP (using TCP Authentication Option), for example, have their own switchover mechanisms for rotating keys. MACsec, for example, has built-in support for autorotation where the device keeps using the old secrets until the new secrets are negotiated among the peers. Data management module 200 can include one or more MACsec agents to manage MACsec state for corresponding MACsec peer groups, including negotiating connections, reacting to configuration changes, and so on. When a push agent generates new secrets for a given peer group, the push agent can load the secrets and signal or otherwise inform the corresponding MACsec agent that new secrets are available. The MACsec agent can then coordinate switching over to the new secrets, including when to switch the members in the peer group to the new secrets.

On the other hand, protocols like IS-IS, Resource Reservation Protocol (RSVP), Label Distribution Protocol (LDP), and others do not have such mechanisms, but rather involve more individualized steps to perform key rotation. In some embodiments, for example, the push agent coordinates steps of the rotation with each device in the peer group. The push agent, for example, can configure the new secret value on each member in the peer group. The push agent can then enable the new secret in each member, followed by the push agent deleting the old secret from each member to cause the member to use the new secret.

At operation 412, the centralized manager can verify the new cryptographic information has taken effect; i.e., is being used by the peer group. In some embodiments, for example, the centralized manager can monitor the state of the devices in a peer group that was configured with new cryptographic information to determine if the new cryptographic information has taken effect. As noted above, each device (e.g., network device, client device) in deployment 100 can be associated with one or more device agents to collect device state and write the device state to the system state database. The device state in a device can indicate whether the cryptographic information has taken effect in that device. When the state information indicates that the new configuration of cryptographic information has taken effect, the rotation agent can mark the new cryptographic information as "active" in the system state database and delete the old cryptographic information from the system state database.

In some embodiments, for example, verification can include validating a newly generated key to ensure that the key is in use without having to directly view the key itself. For example, indirect methods such as fingerprinting the key, hashing the key, and the like can be used to validate a unique and otherwise obscured representation of the key.

In some embodiments, verification can include checking that keys are not repeated across peer groups. Consider a case where we have four switches in two peer groups: A talking to B, and C talking to D. The A-B and C-D peer groups should use different keys. In some embodiments, verification can include the centralized controller viewing the hash of each key and ensuring that the hash for A-B differs from that of C-D. The verification can ensure that unique secrets are being used across the deployment to increase security strength. The verification can also be used to determine that the keying source is not "stuck" and generates the same output for the entire deployment.

Figure 5:
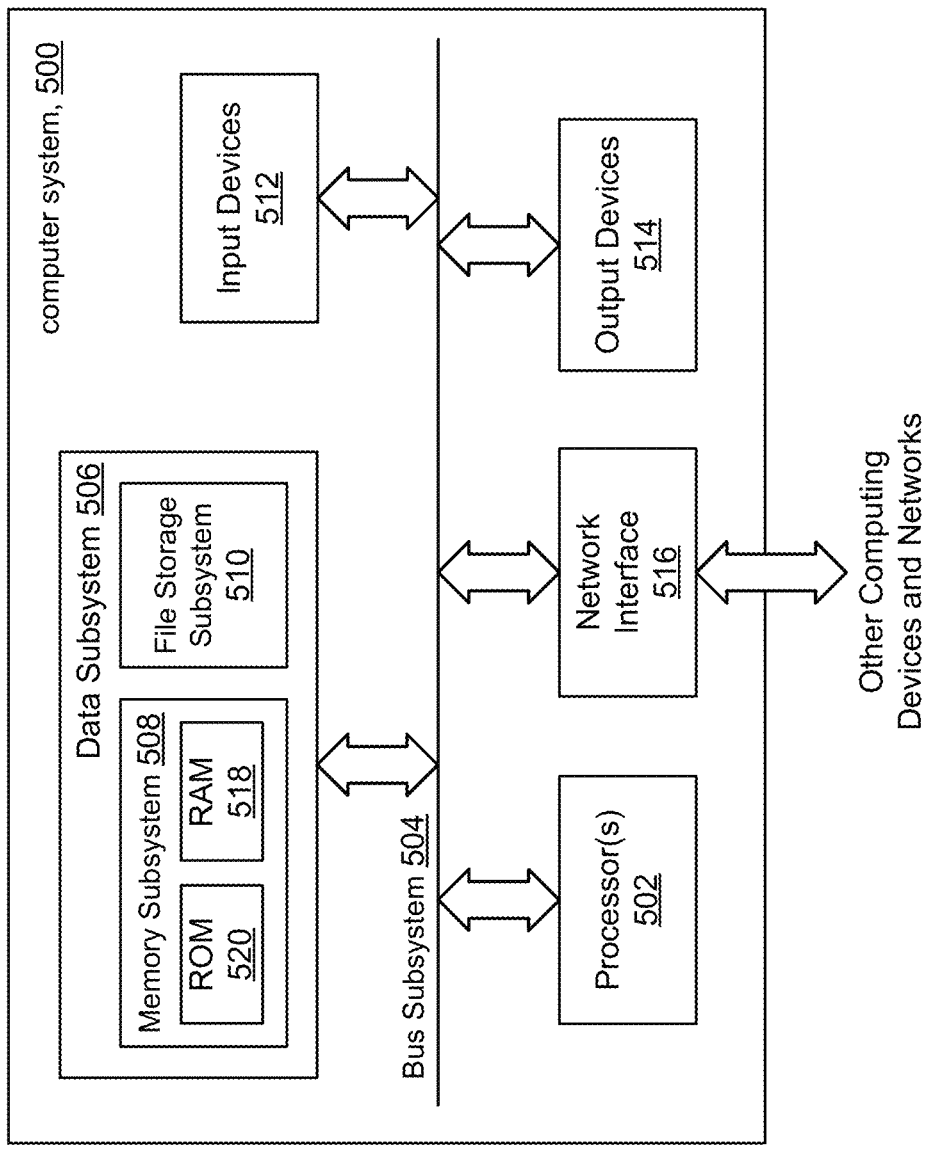
FIG. 5 shows an illustrative computing system adapted in accordance with the present disclosure.

FIG. 5 depicts a simplified block diagram of an example computer system 500 according to certain embodiments. Computer system 500 can be used to implement centralized manager 102 described in the present disclosure. In some embodiments, computer system 500 includes one or more processors 502 that communicate with a number of peripheral devices via bus subsystem 504. These peripheral devices include data subsystem 506 (comprising, for example, memory subsystem 508 and file storage subsystem 510), user interface input devices 512, user interface output devices 514, and network interface subsystem 516.

Bus subsystem 504 can provide a mechanism that enables the various components and subsystems of computer system 500 to communicate with each other as intended. Although bus subsystem 504 is shown schematically as a single bus, alternative embodiments of the bus subsystem can utilize multiple busses.

Network interface subsystem 516 can serve as an interface for communicating data between computer system 500 and other computer systems or networks. Embodiments of network interface subsystem 516 can include, e.g., Ethernet cards, Wi-Fi, digital subscriber line (DSL) units, and/or the like.

User interface (UI) input devices 512 can include a keyboard, pointing devices (e.g., mouse, trackball, touchpad, etc.), a touch-screen incorporated into a display, audio input devices (e.g., voice recognition systems, microphones, etc.) and other types of input devices. In general, use of the term "input device" is intended to include all possible types of devices and modes (e.g., web access) for accessing computer system 500.

UI output devices 514 can include a display subsystem, a printer, or non-visual displays such as audio output devices, etc. The display subsystem can be, e.g., a flat-panel device such as a liquid crystal display (LCD) or organic light-emitting diode (OLED) display. In general, use of the term "output device" is intended to include all possible types of devices and mechanisms for outputting information from computer system 500.

Data subsystem 506 includes memory subsystem 508 and file/disk storage subsystem 510 represent non-transitory computer-readable storage media that can store program code and/or data, which when executed by processor 502, can cause processor 502 to perform operations (e.g., FIG. 4) in accordance with embodiments of the present disclosure.

Memory subsystem 508 includes a number of memories including main random access memory (RAM) 518 for storage of instructions and data structures (e.g., DB component 222) during program execution and read-only memory (ROM) 520 in which fixed instructions are stored. File storage subsystem 510 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 500 is illustrative and many other configurations having more or fewer components than system 500 are possible.

Further Examples

In accordance with the present disclosure, a method in a centralized orchestration and provisioning system of a networked communication system includes: storing a plurality of cryptographic information in a database of the centralized orchestration and provisioning system, the plurality of cryptographic information used by a plurality of devices in the networked communication system; automatically and repeatedly updating, absent user intervention, the plurality of cryptographic information stored in the database; and with each update to cryptographic information used by a peer group comprising a subset of devices among the plurality of devices, automatically replacing, absent user intervention, cryptographic information currently being used by the peer group with the updated cryptographic information. Communications among the subset of devices of the peer group is secured using the updated cryptographic information.

In accordance with some embodiments, the plurality of cryptographic information comprises information for a plurality of security protocols. The security protocols are used by respective peer groups of the networked communication system.

In accordance with some embodiments, the method further includes verifying that the updated cryptographic information has taken effect based on state information contained in the subset of devices of the peer group.

In accordance with some embodiments, the centralized orchestration and provisioning system stores a network topology that identifies devices in the networked communication system, the method further comprising using the network topology to identify the subset of devices.

In accordance with some embodiments, the method further includes receiving information from a user that specifies one or more schedules for updating the plurality of cryptographic information. The plurality of cryptographic information stored in the database is automatically updated in accordance with the one or more schedules specified by the user.

In accordance with some embodiments, the method further includes receiving information from a user that specifies update frequencies for peer groups in the networked communication system. Cryptographic information used by a given peer group is automatically updated in accordance with the update frequency specified by the user for the given peer group.

In accordance with some embodiments, the method further includes receiving information from a user that specifies different update frequencies for different security protocols used in the networked communication system. Cryptographic information used by a given security protocol is automatically updated in accordance with the update frequency specified by the user for the given communication protocol.

In accordance with some embodiments, updating the plurality of cryptographic information includes the centralized orchestration and provisioning system communicating with a hardware security module to generate cryptographic keys for the cryptographic information.

In accordance with the present disclosure, there is a network manager in communication with devices comprising a networked communication system. The network manager includes one or more computer processors; and a computer-readable storage medium comprising instructions for controlling the one or more computer processors to: automatically generate cryptographic information for the devices in the networked communication system, the cryptographic information to be used by the devices to secure communication among the devices; automatically distribute the generated cryptographic information to the devices in the networked communication system to update cryptographic information currently being used by the devices; and repeat generation and distribution of cryptographic information according a schedule. The the generation and distribution of cryptographic information occurs without user interaction.

In accordance with some embodiments, groups of devices in the networked communication system communicate with each other using two or more different security protocols. The computer-readable storage medium further comprises instructions for controlling the one or more computer processors to generate cryptographic information for the two or more security protocols.

In accordance with some embodiments, the computer-readable storage medium further comprises instructions for controlling the one or more computer processors to verify that the distributed cryptographic information has taken effect based on state information contained in the devices.

In accordance with some embodiments, the computer-readable storage medium further comprises instructions for controlling the one or more computer processors to receive the schedule from a user.

In accordance with some embodiments, the schedule specifies frequencies for generating cryptographic information for different security protocols used by groups of devices in the networked communication system.

In accordance with some embodiments, the network device includes a hardware security module. The computer-readable storage medium further comprises instructions for controlling the one or more computer processors to communicate with the hardware security module in connection with generating the cryptographic information for the devices in the networked communication system.

In accordance with the present disclosure, a method in a network manager of a networked communication system, the method comprising automatically rotating cryptographic information stored in devices in the networked communication system. The devices use the cryptographic information to provide secured communication within the networked communication system. The rotating is performed autonomously without interaction of a user. The rotating includes: automatically and autonomously generating cryptographic information; and automatically and autonomously storing the generated cryptographic information in the devices in the networked communication system to replace cryptographic information previously stored in the devices.

In accordance with some embodiments, the method further includes periodically rotating the cryptographic information in accordance with a rotation schedule.

In accordance with some embodiments, the method further includes receiving the rotation schedule from a user.

In accordance with some embodiments, groups of devices in the networked communication system use different security protocols. The cryptographic information for the different security protocols are periodically rotated at different frequencies.

In accordance with some embodiments, generating the cryptographic information includes communicating with a hardware security module.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method in a centralized orchestration and provisioning system of a networked communication system, the method comprising:
    storing a plurality of cryptographic information in a database of the centralized orchestration and provisioning system, wherein the plurality of cryptographic information is used by a plurality of peer groups in the networked communication system, wherein each peer group comprises a subset of devices in the networked communication system that employ a common security protocol for secured communications, and wherein different peer groups employ different security protocols;
    receiving a rotation policy that includes, for each peer group in the plurality of peer groups:
        information identifying members of said each peer group;
        a security protocol used by said each peer group;
        one or more parameters of the security protocol;
        a schedule defining a periodicity for generating one or more pieces of cryptographic information associated with said each peer group; and
        a keying source to be used for generating the one or more pieces of cryptographic information;
    automatically and repeatedly updating, absent user intervention, the plurality of cryptographic information stored in the database in accordance with the rotation policy; and
    with each update to cryptographic information currently used by a peer group in the plurality of peer groups, automatically replacing, absent user intervention, the cryptographic information with the updated cryptographic information, wherein communications among the subset of devices of the peer group is secured using the updated cryptographic information.

2. The method of claim 1, wherein the plurality of cryptographic information comprises, for each of the different security protocols, one or more cryptographic keys used by said each different security protocol.

3. The method of claim 1, further comprising verifying that the updated cryptographic information has taken effect based on state information contained in the subset of devices of the peer group.

4. The method of claim 1, wherein the centralized orchestration and provisioning system stores a network topology that identifies devices in the networked communication system, the method further comprising using the network topology to identify the subset of devices.

5. The method of claim 1, wherein the rotation policy is received from a user.

6. The method of claim 1, wherein the rotation policy specifies different schedules for at least some of the peer groups in the plurality of peer groups.

7. The method of claim 1, wherein updating the plurality of cryptographic information includes the centralized orchestration and provisioning system communicating with a hardware security module to generate cryptographic keys for the plurality of cryptographic information.

8. A network manager in communication with devices comprising a networked communication system, the network manager comprising:
    one or more computer processors; and
    a computer-readable storage medium comprising instructions for controlling the one or more computer processors to:
        automatically generate a plurality of cryptographic information for a plurality of peer groups in the networked communication system, wherein each peer group comprises a subset of devices in the networked communication system that employ a common security protocol, wherein cryptographic information for each peer group is used by the subset of devices of the peer group to implement the common security protocol, and wherein different peer groups employ different security protocols;
        automatically distribute the plurality of cryptographic information to the plurality of peer groups in the networked communication system to update cryptographic information currently being used by each peer group; and
        repeat generation and distribution of the plurality of cryptographic information,
    wherein the generation and distribution of the plurality of cryptographic information occurs without user interaction, and
    wherein the generation and the distribution are performed in accordance with a rotation policy received by the network manager, the rotation policy including, for each peer group in the plurality of peer groups:
        information identifying members of said each peer group;
        a security protocol used by said each peer group;
        one or more parameters of the security protocol;
        a schedule defining a periodicity for generating one or more pieces of cryptographic information associated with said each peer group; and
        a keying source to be used for generating the one or more pieces of cryptographic information.

9. The network device of claim 8, wherein the plurality of cryptographic information comprises, for each of the different security protocols, one or more cryptographic keys used by said each different security protocol.

10. The network device of claim 8, wherein the computer-readable storage medium further comprises instructions for controlling the one or more computer processors to verify that the distributed plurality of cryptographic information has taken effect based on state information contained in the plurality of peer groups.

11. The network device of claim 8, wherein the computer-readable storage medium further comprises instructions for controlling the one or more computer processors to receive the rotation policy from a user.

12. The network device of claim 8, wherein the rotation policy specifies different schedules for at least some of the peer groups in the plurality of peer groups.

13. The network device of claim 8, further comprising a hardware security module, wherein the computer-readable storage medium further comprises instructions for controlling the one or more computer processors to communicate with the hardware security module in connection with generating the plurality of cryptographic information for the plurality of peer groups in the networked communication system.

14. A method in a network manager of a networked communication system, the method comprising:
 automatically rotating a plurality of cryptographic information used by a plurality of peer groups in the networked communication system, wherein each peer group comprises a subset of devices in the networked communication system that employ a common security protocol, wherein cryptographic information for each peer group is used by the subset of devices of the peer group to implement the common security protocol, wherein different peer groups employ different security protocols, wherein the rotating is performed autonomously without interaction of a user, wherein the rotating includes:
 automatically and autonomously generating the plurality of cryptographic information; and
 automatically and autonomously storing the generated plurality of cryptographic information in the plurality of peer groups in the networked communication system to replace cryptographic information previously stored in each peer group,
 wherein the rotating is performed in accordance with a rotation policy received by the network manager that includes, for each peer group in the plurality of peer groups:
  information identifying members of said each peer group;
  a security protocol used by said each peer group;
  one or more parameters of the security protocol;
  a schedule defining a periodicity for generating one or more pieces of cryptographic information associated with said each peer group; and
  a keying source to be used for generating the one or more pieces of cryptographic information.

15. The method of claim 14, periodically rotating the plurality of cryptographic information in accordance with the rotation policy.

16. The method of claim 15, wherein the rotation policy is received from a user.

17. The method of claim 14, wherein the rotation policy specifies different schedules for at least some peer groups in the plurality of peer groups.

18. The method of claim 14, wherein generating the plurality of cryptographic information includes communicating with a hardware security module.

\* \* \* \* \*